United States Patent [19]

Fisermann

[11] Patent Number: 4,614,862

[45] Date of Patent: Sep. 30, 1986

[54] ELECTRICALLY ACTUATABLE LOCKING DEVICE

[75] Inventor: Armin Fisermann, Velbert, Fed. Rep. of Germany

[73] Assignee: Schulte-Schlagbaum Aktiengesellschaft, Velbert, Fed. Rep. of Germany

[21] Appl. No.: 631,023

[22] Filed: Jul. 16, 1984

[30] Foreign Application Priority Data

Jul. 21, 1983 [DE] Fed. Rep. of Germany ....... 3326266

[51] Int. Cl.[4] .............................................. G06K 7/01

[52] U.S. Cl. ................................ 235/382.5; 235/432; 340/825.31; 346/22; 346/42

[58] Field of Search ..................... 235/382, 382.5, 432; 340/825.31; 346/14 MR, 42, 52, 56, 22

[56] References Cited

U.S. PATENT DOCUMENTS

| | | | |
|---|---|---|---|
| 3,422,441 | 1/1969 | Chapsky | 346/14 MR |
| 4,482,802 | 11/1984 | Aizawa et al. | 235/382 X |
| 4,538,056 | 8/1985 | Young et al. | 340/825.31 X |

*Primary Examiner*—David L. Trafton
*Attorney, Agent, or Firm*—Martin A. Farber

[57] ABSTRACT

An electrically actuatable locking device having a housing provided with an insertion channel for a card-shaped key element, at least one memory which reads the code of the key element when arranged in said housing, and, in order to increase the safety and value in use of such a locking device, an insertion element of a printer reads the information in the memory and can be introduced into the insertion channel.

8 Claims, 4 Drawing Figures

FIG. 1
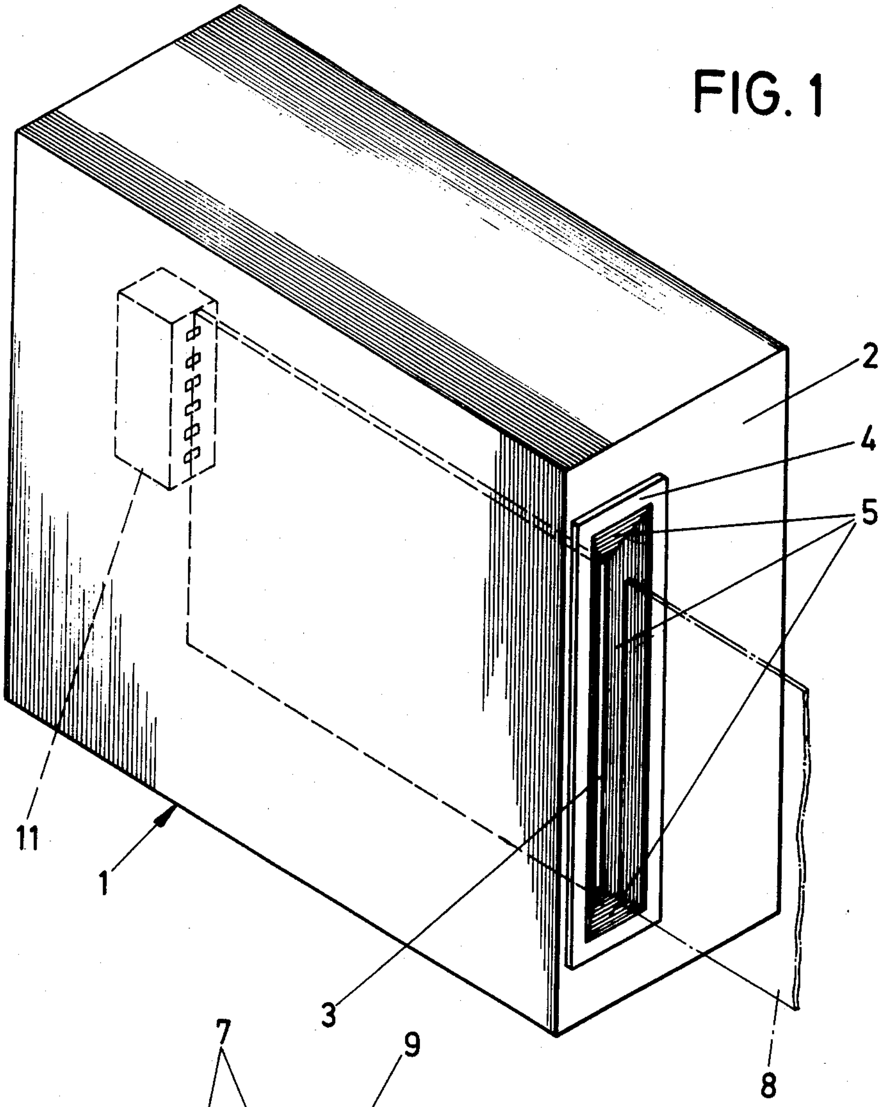
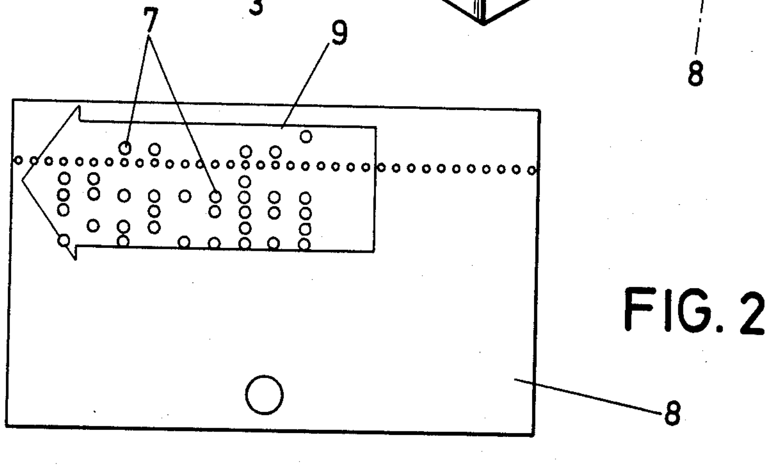
FIG. 2

ELECTRICALLY ACTUATABLE LOCKING DEVICE

BACKGROUND OF THE INVENTION

The present invention relates to an electrically actuatable locking device having a housing with an insertion channel for receipt of a coded card-shaped key element, within which housing there is arranged at least one memory which reads the code of the key element.

The control of such locking devices presupposes a properly coded, card-shaped key element. When this element is inserted into the insertion channel the code is read by the card reader. If the information read corresponds to the value introduced into the memory then the corresponding locking pulse is produced. Such locking devices are particularly suitable in locking systems. If they are used, for instance, in hotels, then after the use of the rented room has terminated, the entrance authorization for the locking device can be easily changed. This then requires a correspondingly modified coded card-shaped key element.

The object of the invention is to increase the security value and value in use of such electrically actuatable locking devices of the type in question.

SUMMARY OF THE INVENTION

According to the invention there is provided an insertion element of a printer, which insertion element enables the printer to read the information in the memory and is insertable into the insertion channel.

As a result of this development, the security of an electrically actuatable locking device is increased. The existing group of persons authorized for the locking device can be checked in simple manner. If the locking device furthermore contains a clock, then, for instance, a verification as to the time and users of the last two hundred uses of the lock can be effected. For this purpose it is merely necessary to insert into the insertion channel the insertion element of the printer or the like which calls for the information from the memory into the insertion channel. During the final phase of the insertion motión, it then, for instance, provides access to the memory for reading. The printer is preferably a portable unit by means of which a large number of locking devices can be monitored. The insertion channel therefore, in addition to its function of receiving the key element, has the additional function of receiving an insertion element (such as a card) which inquires from the memory of the lock as to the coding functions present in the memory, including previous changes in code, uses of code by previously inserted key elements, etc. The insertion element may itself also contain coded information which is read by the memory as authorization for it to be read.

One advantageous further embodiment of the slide is the provision of a plug on the end of a card which can be inserted in form-locked manner into the insertion channel. The shape of the card corresponds to that of the card-shaped key element. Upon the insertion of this card its plug is already aligned with the plug receptacle so that the plug connection can be more easily produced. Since the plug receptacle is arranged at the end of the insertion channel, a separate insertion opening for the plug is unnecessary. In this way the cost of manufacture can be reduced. Furthermore, the location of the plug receptacle is concealed, which substantially excludes the possibility of unauthorized tampering.

BRIEF DESCRIPTION OF THE DRAWINGS

One embodiment of the invention will be described below with reference to FIGS. 1 to 4 of the drawing, in which:

FIG. 1 shows in perspective an electrically actuatable locking device, seen in the direction of the insertion channel;

FIG. 2 is a view of a corresponding card-shaped key element;

DETAILED DESCRIPTION OF THE PREFERRED EMBODIMENT

Figure 3:
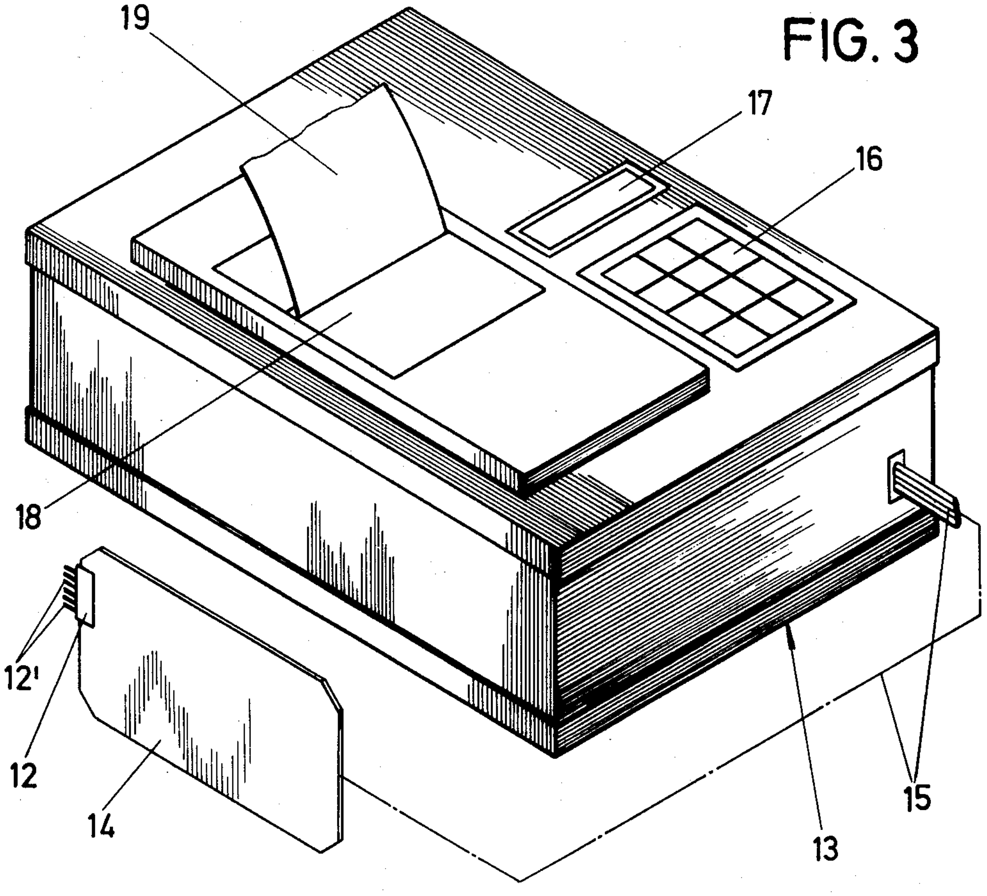
FIG. 3 is a perspective view of a printer with corresponding plug.

The electrically actuatable locking device has a parallelepiped-shaped housing 1 with insertion channel 3 commencing at its one end 2. The channel is provided at its insertion end with a frame 4 having insertion bevels 5 which lead to the insertion channel.

Within the housing 1 of the locking device there is a card reader 6 (FIG. 4), located at the height of the insertion channel 3. The information provided in the form of holes 7 in a card-shaped key element 8 can be read by this card reader when the key element 8 has been inserted the proper distance into the insertion channel 3. The direction of insertion can be noted from an arrow 9 provided on the key element 8 as shown in FIG. 2.

The housing 1 furthermore contains a memory 10 which stores the information read.

At the end of the insertion channel 3 within the housing 1 a plug receptacle 11 is arranged. Receptacle 11 is in communication with memory 10 and cooperates with a plug 12 of a card 14 of a printer 13, which card 14 enables reading of the information in the memory 10. Card 14, with plug 12 seated on the end of card 14, can be inserted in form-locked fashion (i.e. in proper alignment position by the cooperating shape of the channel and card) into the channel 3, whereupon plug 12 is mated with receptacle 11. Electrical connection between the plug 12 and the printer 13 is established by means of a multi-wire cable 15.

The printer 13 is a portable unit. It is preferably battery-powered. It contains a key board 16 and a display 17, as well as a printing mechanism 18 by means of which the corresponding values can be recorded on a printing tape 19.

Verification of the group of persons having current authorization for the locking device is effected by inserting the card 14 bearing the plug 12 into the insertion channel 3, the card 14 being held in such manner that the plug 12 is towards the top. In the final phase of the movement of insertion the plug pins 12' enter in coupling fashion into the plug receptacle 11 and produce the electric connection between the memory 10 and the printer 13. After the printer 13 is placed in operation the corresponding values in the memory are printed on the printing tape 19 by the printing mechanism 18.

If the verification is also to refer to time, then the locking device may also contain a clock so that the corresponding time is also indicated as additional data which can be utilized.

Figure 4:
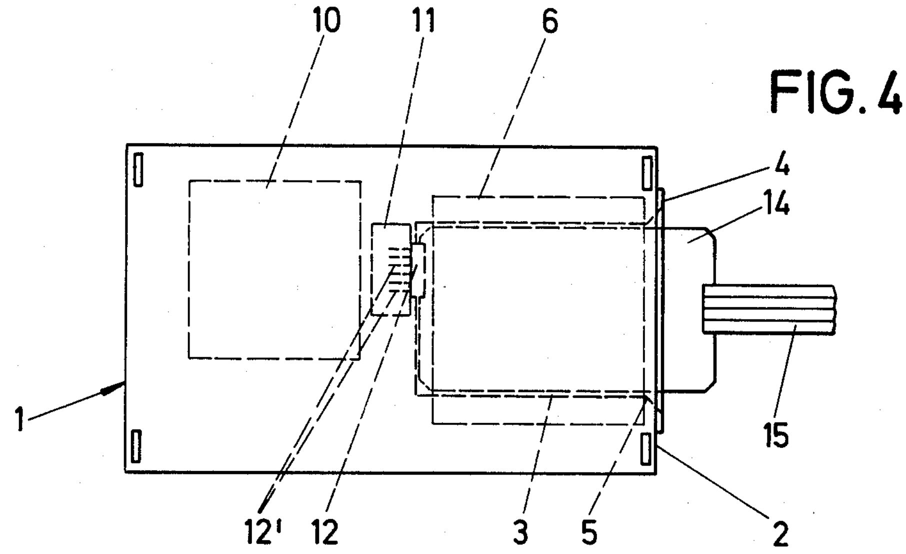
FIG. 4 is a view of the locking device with the card bearing the plug inserted into the insertion channel.

From FIGS. 1 and 4 it can be seen that the plug receptacle 11 is in a concealed position, which essentially precludes unauthorized tampering.

Further embodiments are within the spirit and scope of the present invention. For example, a display having, for instance, a connected printer can be used instead of the printer.

I claim:

1. An electrically actuatable locking system comprising a housing formed with an insertion channel for receiving a coded card-shaped key element, at least one memory means for reading a code of the key element arranged in said housing for actuating a lock of the locking system, a portable printer including means comprising an insertion element insertable into the insertion channel for enabling the printer to read the information in the memory, said insertion element is shaped like said key element.

2. The electrically actuatable locking system according to claim 1, wherein said insertion element comprises a card and a plug, said plug is arranged at an insertion end of said card and communicatable with said memory, said card is insertable in form-locked complementary manner into the insertion channel.

3. The electrically actuatable locking system according to claim 2, wherein said housing further comprises a receptacle for receiving said plug when said card is inserted into the insertion channel, said receptacle being in communication with said memory and located at an inside wall of said insertion channel, whereby said receptacle communicates said plug with said memory when said card is inserted into the insertion channel.

4. The electrically actuatable locking system according to claim 3, wherein said receptacle is located off-center at said inside wall of said insertion channel and said plug is cooperatively located the same amount off-center at said end of said card.

5. The electrically actuatable locking system according to claim 1, further comprising a display having said printer operatively connected thereto.

6. An electrically actuatable locking system having a housing with an insertion channel for receipt of a coded card-shaped key element for actuating a lock of the locking system, within which housing at least one memory which reads the code of the key element is arranged, comprising a printer including means comprising an insertion element insertable into the insertion channel for enabling the printer to read the information in the memory, said insertion element comprises a plug and a card, said plug being arranged on an insertion end of said card, said card being insertable in form-locked manner into the insertion channel, said housing further comprising a receptacle for receiving said plug, said receptacle being in communication with said memory and located at an inside wall of said insertion channel, and said receptacle is located off-center at said inside wall of said insertion channel and said plug is cooperatively located substantially the same amount off-center at the end of said card.

7. The electrically actuatable locking system according to claim 2 or 6, wherein said card is codable with information confirmable by said memory as authorization for enabling the printer to read the information in the memory.

8. The electrically actuatable locking system according to claim 1 or 6, wherein said housing forms entrance bevels at an insertion end of said insertion channel for guiding said key element and said insertion element respectively into said insertion channel.

* * * * *